United States Patent [19]

Satoh et al.

[11] 4,109,129
[45] Aug. 22, 1978

[54] HIGH FREQUENCY ENERGY APPARATUS HAVING AUTOMATIC FINAL TEMPERATURE COMPENSATOR

[75] Inventors: Kenji Satoh; Mitsuru Watanabe, both of Yokohama, Japan

[73] Assignee: Hitachi Heating Appliances Co., Ltd., Japan

[21] Appl. No.: 752,851

[22] Filed: Dec. 21, 1976

[51] Int. Cl.² ............................................. H05B 9/06
[52] U.S. Cl. ........................... 219/10.55 B; 99/331; 219/497; 219/499
[58] Field of Search .................. 219/10.55 B, 10.55 E, 219/10.55 R, 10.55 M, 494, 497, 499, 501, 504, 505, 519; 99/331

[56] References Cited

U.S. PATENT DOCUMENTS

| | | | |
|---|---|---|---|
| 3,281,568 | 10/1966 | Haagensek | 219/10.55 B |
| 3,431,400 | 3/1969 | Iida et al. | 219/501 |
| 3,875,361 | 4/1975 | Fukui et al. | 219/10.55 B |
| 3,999,027 | 12/1976 | Moore | 219/10.55 B |
| 4,009,359 | 2/1977 | Tallmadge et al. | 219/10.55 B |

*Primary Examiner*—Bruce A. Reynolds
*Attorney, Agent, or Firm*—Craig & Antonelli

[57] ABSTRACT

A high frequency energy apparatus for heating an object contained in a heating chamber by high frequency energy which is supplied to the chamber. The temperature of the air in the heating chamber or flowing out thereof is detected. When the temperature of the air reaches a predetermined level, the high frequency energy is controlled. The predetermined level is also changed with the heating time.

23 Claims, 6 Drawing Figures

HIGH FREQUENCY ENERGY APPARATUS HAVING AUTOMATIC FINAL TEMPERATURE COMPENSATOR

BACKGROUND OF THE INVENTION

1. Field of the Invention

This invention relates to a high frequency energy apparatus, more in particular to an improvement in a control system for a high frequency energy apparatus such as a microwave oven for automatically heating an object to a proper temperature.

2. Description of the Prior Art

In conventional high frequency energy apparatuses for heating an object contained in a heating chamber by high frequency energy which is supplied to the heating chamber, the heating of the object is controlled by regulating the heating time with a timer or the like at the discretion of the user. A proper heating time, however, depends on such factors as the quantity, quality (for example, water content or component substances), initial temperature, and the shape of the object. The setting of the heating time therefore requires considerable skill, often causing overheated or underheated conditions of the object due to an improper setting of the heating time.

Various attempts have been made to overcome these disadvantages in automatically controlling the heating of the object by detecting the temperature of the object per se. One of them utilizes the fact that the temperature of the air in the heating chamber increases with the increase in temperature of the object on the pan in the heating chamber accordingly as it is heated by high frequency energy. In this case, the high frequency energy apparatus is typically provided with an exhaust hole through which the air in the heating chamber is exhausted from the chamber and an exhaust pathway through which the air is expelled out of the high frequency energy apparatus. A temperature-sensitive element is disposed in the vicinity of the exhaust hole or about halfway in this exhaust pathway to detect the temperature of the air exhausted from the heating chamber. In this way, the heating of the object may be controlled, by detecting the relative temperature of the object. As described in detail later, however, the gradient of the characteristic curve of the temperature of the object versus that of the exhaust air varies with the quantity or mass of the object to be heated. The result is that an object, which may be heated to the desired temperature in a certain quantity or mass, may fail to reach or may be heated above the desired temperature in another quantity or mass. This leads to a great variation in the final temperature, making proper heating very difficult. Further, it is not only the quantity or mass of the object but also the quality thereof that causes an overheated or underheated condition thereof.

SUMMARY OF THE INVENTION

A primary object of the invention is to provide a high frequency energy apparatus obviating the above disadvantages.

Another object of the invention is to provide a high frequency energy apparatus capable of heating an object automatically and properly in accordance with the quantity and quality of the object.

The present invention is intended to achieve these objects on the basis of the fact that the greater the quantity of an object or the higher the water content thereof if the weight is the same, the longer it generally takes to properly heat the object on the one hand and the higher the temperature of the air exhausted from the heating chamber rises on the other. In view of this, the setting of the temperature of the exhaust air which indicates that the heating is to be stopped is increased progressively with the heating time required, thereby compensating for error due to the variation of quantity or quality of the object.

DETAILED DESCRIPTION OF THE PREFERRED EMBODIMENT

Figure 1:
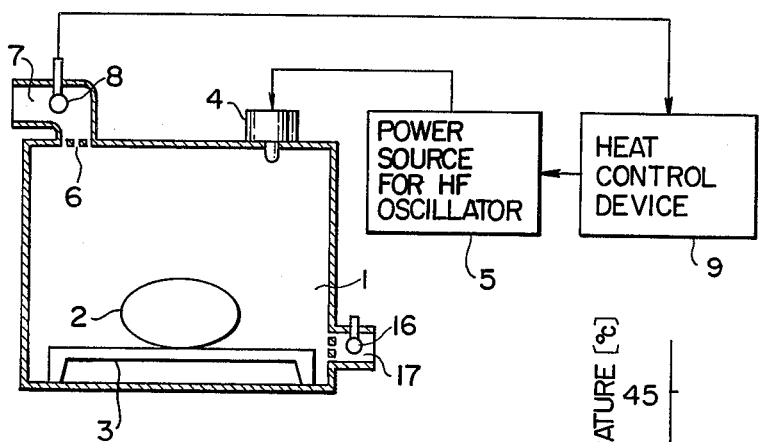
FIG. 1 is a schematic diagram showing a configuration of the high frequency energy apparatus according to the present invention.

With reference to the schematic block diagram of FIG. 1 showing a high frequency energy apparatus to which the present invention is applied, a conventional apparatus will first be explained for better understanding of the invention.

Figure 2:
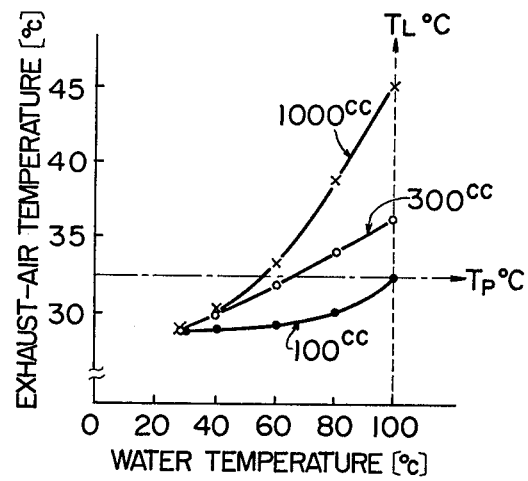
FIG. 2 is a graph for explaining the variation in final temperature in a conventional control device.

In the drawing, an object 2 placed on a pan 3 in a heating chamber 1 is heated by high frequency energy supplied from a high frequency oscillator tube 4. Reference numeral 6 is an exhaust hole provided in a wall of the chamber 1 for exhausting the air therein from the chamber while preventing the high frequency energy from escaping therefrom. Numeral 7 shows an exhaust pathway for exhausting the air from the exhaust hole in the heating chamber 1, out of the housing of the high frequency energy apparatus. Numeral 8 shows a temperature-sensitive element placed at a predetermined point in the exhaust pathway 7. By detecting the temperature of the air exhausted from the heating chamber 1 by means of the temperature-sensitive element 8, the temperature of the object 2 is approximately determined for the purpose of heating control. An output of the temperature-sensitive element 8 is applied to the heat control device 9. When the output of the temperature-sensitive element 8 reaches a predetermined value, the control device 9 shuts off the power source 5 for the high frequency oscillator tube, thereby stopping the oscillation of the high frequency oscillator tube 4. The heating of the object 2 is thus controlled by the heat control device 9 which will be described again later with reference to FIG. 3. This method is accompanied by a large variation in final temperature depending on factors such as the mass of the object. The result of an experiment conducted with the above-mentioned device taking water as the object 2 is shown in FIG. 2. The temperature characteristic curves of the water versus the exhaust air have different gradients depending on the quantity or mass of the water. Assume for example that the control device is so set that the heating is stopped at a point in time where the temperature of the 100 cc of water reaches the desired value $T_L°$ C (for example 100° C) and the temperature of the exhaust air reaches a value $T_P°$ C (for example above 32.5° C). As is clear from FIG. 2, the final temperature of the water at the same temperature $T_P°$ C (32.5° C) is subjected to such a great variation that the heating is terminated undesirably at 56° C for 1000 cc of water and 68° C for 300 cc of water, thereby making proper heating impossible. It has also been explained that the quality of the object to be heated is another factor contributing to an insufficiently heated or overheated condition of the object.

The present invention is intended to attain proper heating by eliminating these shortcomings. According to the invention, the heat control device 9 for the high frequency energy apparatus shown schematically in the block diagram of FIG. 1 is improved. The heat control device 9 thus improved according to the present invention is shown in the form of a preferred embodiment in FIG. 3.

Figure 3:
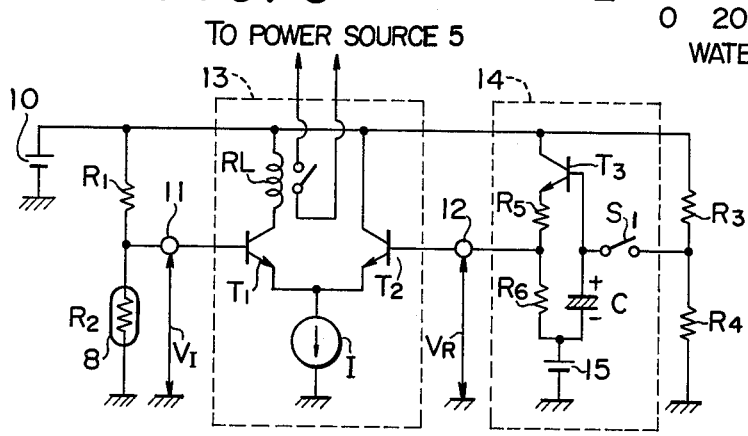
FIG. 3 is a circuit diagram showing an embodiment of the present invention.

With reference to FIG. 3, the control device according to the invention will first be compared with a conventional control device.

In FIG. 3, numeral 8 shows a temperature-sensitive element also shown in FIG. 1, which may be, for instance, a thermistor. Resistors $R_1$, $R_2$, $R_3$ and $R_4$ make up a bridge circuit, the resistor $R_2$ taking the form of thermistor 8 on one side thereof. Numeral 13 shows a comparator circuit which uses, for example, a differential amplifier including transistors $T_1$ and $T_2$. Symbol RL shows a relay inserted in the output circuit of the transistor $T_1$ of the differential amplifier for regulating the operation of the power source 5 for the high frequency oscillator tube 4. Reference character I shows a constant current source. These components make up the control device 9 of the conventional apparatus. A terminal 11 of the differential amplifier 13 is connected to a junction point of the resistors $R_1$ and $R_2$. In the conventional apparatus, the other terminal 12 is connected directly to a junction point of the resistors $R_3$ and $R_4$. Numeral 14 shows a circuit for compensating for an error in final temperature due to the variety in quantity and quality of the object to be heated, according to the present invention. Prior to explaining the compensating circuit 14, a conventional apparatus without such a compensating circuit will be first described.

The resistors $R_1$ and $R_2$ of the bridge circuit serve to divide the voltage of the DC power supply 10 so as to produce a voltage $V_I$ at the one input terminal 11 of the comparator circuit 13. The voltage $V_I$ varies in accordance with the temperature detected by the thermistor 8. The other resistors $R_3$ and $R_4$ of the bridge serve to produce a reference voltage $V_R$ at the other input terminal 12 of the comparator circuit 13. The comparator 13 compares the input voltage $V_I$ with the reference voltage $V_R$ so that the current flowing in the coil of the relay RL is changed in accordance with the difference therebetween. The contacts of the relay RL are connected to the power source 5 for the high frequency oscillator tube 4 and are so arranged that the high frequency oscillation is stopped upon the opening of the contacts. Before initiating the heating operation, the input voltage $V_I$ is set higher than the reference voltage $V_R$ and the transistor $T_1$ included in the differential amplifier of the comparator 13 conducts while the transistor $T_2$ is cut off, so that the current flowing in the coil of the relay RL causes its contacts to be closed to start the high frequency oscillation. With the start of heating, the temperature of the air exhausted from the heating chamber 1 increases and therefore the resistance of the thermistor 8 constituting a temperature-sensitive element is gradually decreased, followed by gradual decrease in the input voltage $V_I$. At the point in time when the temperature of the exhaust air reaches a preset value, the reduction of the current flowing in the coil of the relay RL due to the reduction in the input voltage $V_I$ makes the relay contacts open, thereby stopping the high frequency oscillation.

Figure 4:
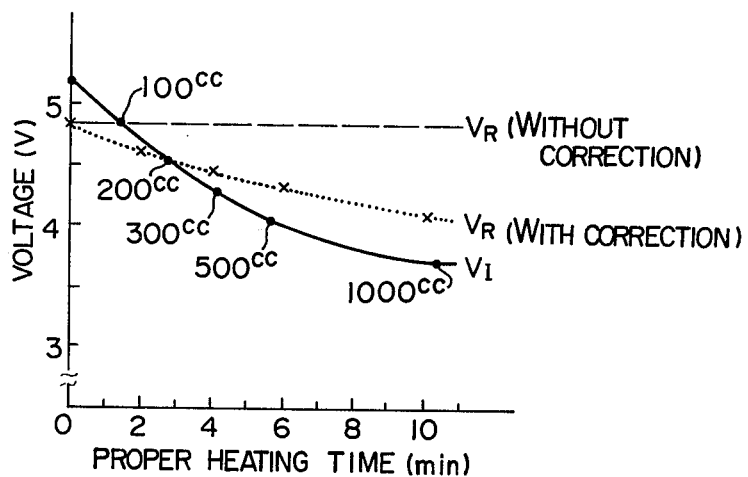
FIG. 4 is a graph for showing the operating principle of the present invention.

If the setting temperature of the exhaust air at which the high frequency oscillation is stopped is kept constant, the final temperature undergoes a large variation according to the quantity or mass of the object 2 as evident from FIG. 2. The solid line in FIG. 4 represents the variation of the input voltage $V_I$ across the thermistor 8 versus the proper heating time for each quantity of water which is referred to as the heating time required to boil the water. The input voltage $V_I$ corresponds to the temperature of exhaust air and therefore the solid line in FIG. 4 indicates that the temperature setting required for proper heating varies with the quantity or mass of the object to be heated. Discussion will be made with reference to the graph of FIG. 4. It takes 2 minutes and 40 seconds to properly boil 200 cc water, for example, and the input voltage $V_I$ is reduced to 4.55 volts upon the completion of proper heating. Similarly, it takes 5 minutes and 36 seconds to boil 500 cc water, for example, and the input voltage $V_I$ is reduced to 4.04 volts when the water comes to the boil. Thus, it will be easily understood that the larger the water quantity, the longer the proper heating time and the greater the reduction in the input voltage $V_I$ during the heating period.

Accordingly, if the reference voltage $V_R$ is kept constant, for example, when it is preset such that 200 cc water is properly boiled, the relay coil will be deenergized to stop the high frequency oscillation before 500 cc water, for example, has been properly boiled. It is possible to reduce the final temperature variation due to water quantity by increasing the temperature setting of exhaust air for stopping the heating, with the increase in water quantity, i.e., by changing the reference voltage $V_R$ with time in accordance with the change in the input voltage $V_I$ shown by the solid line of FIG. 4. The simplest method of correcting the reference voltage $V_R$ is by making use of the charge or discharge characteristics of a capacitor. An example of such a method is embodied in the compensating circuit 14 shown in FIG. 3, which utilizes the attenuation of the voltage across the capacitor C due to discharge thereof. According to the present invention, the compensating circuit 14 is connected between the terminal 12 and the junction point between the resistors $R_3$ and $R_4$. In the compensating circuit 14 of FIG. 3, a switch $S_1$ is closed prior to the start of heating operation so that the capacitor C is charged by a current supplied from the DC power supply 10 through the resistor $R_3$ under the condition where the voltage of the DC power supply 10 is divided by the resistors $R_3$ and $R_4$ of the bridge circuit. The charged voltage across the capacitor C is divided by emitter resistances $R_5$ and $R_6$ of the transistor $T_3$ forming the reference voltage $V_R$ at the terminal 12 in addition to a voltage of a DC voltage source 15. When the heating is started, the switch $S_1$ is opened. The charge of capacitor C is gradually released through the transistor $T_3$ and the resistors $R_5$ and $R_6$, so that the voltage across the capacitor C decreases gradually while at the same time attenuating the reference voltage $V_R$. The reason for using the transistor $T_3$ is to increase the discharge time constant. The DC power supply 15 is provided as illustrated in FIG. 3 for purposes of damping the reference voltage attenuation due to discharge of the capacitor so as to increase the apparent discharge time constant equivalently and setting an upper limit on the heating time thereby to prevent any hazard which otherwise might be caused by overheating. By properly selecting the discharge time constant and the voltage of the DC power supply 15, an approximate correction curve of the reference voltage $V_R$ is obtained. In FIG. 4, the dashed line shows the reference voltage $V_R$ without any correction, which is kept constant. The dotted line, on the other hand, represents the voltage $V_R$ obtained as a result of approximate correction with the compensating circuit 14 of FIG. 3. Although this corrected curve is somewhat apart from an ideal correction curve (which may be the solid-line curve $V_I$ per se or curves obtained by moving the curve $V_I$ parallel in the vertical direction in FIG. 4), an experiment shows such a remarkable effect that the variation in the finish temperatures (aimed at 100° C) for different water quantities ranging from 300 cc to 1000 cc is reduced to 8° C as compared with 23° C without correction. Further improvement in the approximation of the corrected curve of course permits variation in the final temperature with a particular water quantity to be reduced to a negligibly small value.

The configuration of the compensating circuit 14 in FIG. 3 is very simple for its effect. In the case where the capacitor C with a large capacity is used or the input impedance of the comparator circuit 13 is sufficiently large, the transistor $T_3$, the resistors $R_5$ and $R_6$ and DC power supply 15 used in the compensating circuit 14 are not required, and in such a case the compensating circuit may be very simply comprised of only a capacitor and a switch, thus minimizing the cost increase due to the addition of the compensating circuit.

Figure 5:
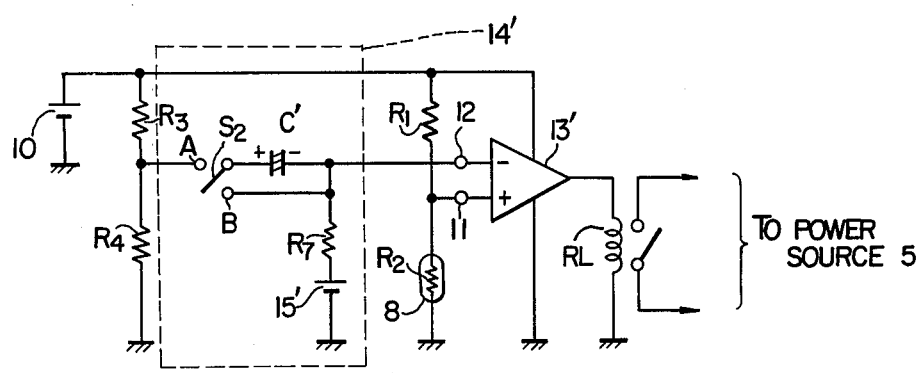
FIG. 5 is a circuit diagram showing another embodiment of the present invention.

Another embodiment of the present invention is shown in FIG. 5. This is a compensating circuit using an operational amplifier as the comparator circuit 13 in FIG. 3, and in which the reference voltage $V_R$ is changed with time by making use of the charge characteristics of a capacitor. In FIG. 5, numeral 13' shows a comparator using a non-reversible operational amplifier having the same functions as the differential amplifier used as the comparator circuit 13 in FIG. 3. A terminal 11 of the comparator 13' is impressed with the voltage $V_I$ corresponding to the temperature of the exhaust air detected by the thermistor 8, while the other terminal 12 of the comparator 13' is impressed with the reference voltage $V_R$. These input voltages $V_I$ and $V_R$ are compared in the comparator 13'. Before heating, the voltage relation is so set that $V_I > V_R$. Accordingly the comparator 13' produces an output voltage of high level with the result that a current flows in the coil of the relay RL to close the contacts thereof. When the relation $V_I < V_R$ is established after the start of heating, the output voltage of the comparator 13' reverses to low level, so that the current flowing in the coil of the relay RL decreases to open its contacts so as to stop the high frequency oscillation.

Numeral 14' in FIG. 5 shows a compensating circuit in which the reference voltage $V_R$ is changed with time using the charge characteristics of the capacitor C'. Prior to the heating operation, the movable contact of a switch $S_2$ is in contact with a fixed contact B thereof and the capacitor C' is in a completely discharged condition. With the start of heating, the movable contact of the switch $S_2$ is brought into contact with another fixed contact A. As a result, the charge current of the capacitor C' flows through the resistors $R_3$ and $R_7$, thereby gradually charging the capacitor C'. It is here assumed that the input impedance of the comparator 13' is very much higher than the resistor $R_7$.

Consequently, a voltage generated at the junction point of the capacitor C' and the resistor $R_7$, which is the reference voltage $V_R$ to be applied to the input terminal 12 of the comparator 13', is reduced with time following the start of heating. In this way, a compensating curve of the reference voltage $V_R$ which is similar to the dotted curve $V_R$ of FIG. 4 derived by utilizing the discharge characteristics of the capacitor C in FIG. 3 is obtained from the charge characteristics of the capacitor C'. Incidentally, the DC power supply 15' has the same functions as the DC power supply 15 in FIG. 3.

The foregoing description refers to the case in which it is possible to reduce greatly the variation in final temperature with the quantity of water used as an object to be heated. This also holds true for other food items, the heating of which is rationalized since the heating time is corrected in accordance with the quantity thereof. This feature is not limited to the heating of the same food item in different quantities, but it has been experimentally established that this invention may also be effectively applied to the compensation for a variety of different food qualities because of the correlation between a proper heating time and a temperature increase of the exhaust air.

It will be understood from the foregoing explanation that according to the present invention the heating time is automatically set to compensate for a variety of the mass and quality of the object by setting a higher exhaust air temperature for stopping high frequency oscillation the longer the proper heating time. As a result, the variation in final temperature is greatly reduced as compared with the conventional control methods, thus extensively contributing to the realization of proper heating.

Although the aforementioned embodiment concerns detection of the temperature of the air exhausted from the heating chamber, the present invention is equally applicable to the detection of the temperature of the air in the heating chamber. In this case, the temperature-sensitive element is shielded from the high frequency energy by a suitable electrical shielding means.

Figure 6:
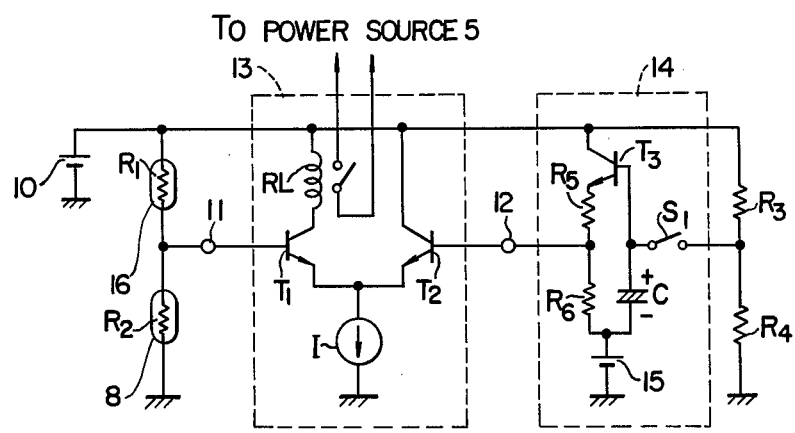
FIG. 6 is a circuit diagram showing still another embodiment of the present invention.

The compensation for variations in ambient temperature is not described in the foregoing embodiment. Such a compensation, however, is possible by providing another thermistor 16, as the resistor $R_1$, in an inlet path 17 (FIG. 1) through which air flows into the heating chamber, for example, as shown in FIG. 6 so that variations in ambient temperature are also compensated for, thereby detecting the temperature increase of the exhaust air correctly to enable proper control of heating operation to be effected.

The air flow in the heating chamber is not specifically described in the embodiment mentioned above. The present invention may be equally applied to not only such a case wherein the air enters into and flows from the heating chamber by means of convection but also such a case wherein the air is sucked into and exhausted out of the heating chamber by a blower, without reducing the meritorious effects of the invention.

In the above-mentioned embodiment, the high frequency oscillation tube 4 is deenergized to stop the oscillation when the temperature of the air exhausted out of the heating chamber reaches a preset value. The present invention may be effectively applied to the case where the high frequency energy is reduced or increased without stopping the oscillation when the temperature of the air exhausted out of the heating chamber reaches a preset value.

We claim:

1. A high frequency energy apparatus for heating an object with high frequency energy, comprising:

a heating chamber for containing and heating said object;

means for generating the high frequency energy;

means for introducing to said heating chamber the high frequency energy generated by said high frequency energy generating means;

means for relatively measuring the temperature of the object being heated;

means for controlling the amount of the high frequency energy supplied to said heating chamber from said high frequency energy generating means when the value measured by said measuring means reaches a value corresponding to a predetermined reference value; and reference value correcting means for automatically varying said predetermined reference value in the same direction of change with the lapse of the heating time.

2. A high frequency energy apparatus according to claim 1, in which said measuring means measures the temperature of an air in said heating chamber in order to relatively measure the temperature of the object being heated.

3. A high frequency energy apparatus according to claim 2, in which said measuring means includes a temperature-sensitive element, the temperature measured by said measuring means is indicated in the form of a voltage corresponding to it, and said reference value is also given as a voltage.

4. A high frequency energy apparatus according to claim 3, in which said reference value correcting means includes a capacitor and means for charging and discharging said capacitor, said reference voltage being a voltage corresponding to the voltage across said capacitor.

5. A high frequency energy apparatus according to claim 4, in which, in use, said capacitor is preliminarily charged up to a predetermined level by said charge/discarge means and subsequently discharged with a time constant of said charge/discharge means.

6. A high frequency energy apparatus according to claim 5, in which said high frequency energy supply amount control means includes means for comparing said voltage corresponding to said measured temperature with said reference voltage so that the amount of the high frequency energy supplied to said heating chamber from said high frequency energy generating means is controlled when the output of said comparator means reaches a predetermined level.

7. A high frequency energy apparatus according to claim 6, in which said comparator means is differential amplifier having two input terminals, said voltage corresponding to said measured temperature being applied to one of said two input terminals of said differential amplifier, said reference voltage being applied to the other input terminal of said differential amplifier, said differential amplifier having an output circuit including an electromagnetic relay for controlling the operation of said high frequency energy generating means.

8. A high frequency energy apparatus according to claim 4, in which, in use, said capacitor is preliminarily discharged to a predetermined level by said charge/discharge means and subsequently charged with a time constant of said charge/discharge means.

9. A high frequency energy apparatus according to claim 8, in which said high frequency energy supply amount control means includes means for comparing said voltage corresponding to said measured temperature with said reference voltage so that the amount of the high frequency energy supplied to said heating chamber from said high frequency energy generating means is controlled when the output of said comparator means reaches a predetermined level.

10. A high frequency energy apparatus according to claim 9, in which said comparator means is a differential amplifier having two input terminals, said voltage corresponding to said measured temperature being applied to one of said two input terminals of said differential amplifier, said reference voltage being applied to the other input terminal of said differential amplifier, said differential amplifier having an output circuit including an electromagnetic relay for controlling the operation of said high frequency energy generating means.

11. A high frequency energy apparatus according to claim 4, in which a DC voltage is coupled to a low potential side of said capacitor to prevent said reference voltage from decreasing below a predetermined value during the heating period.

12. A high frequency energy apparatus according to claim 1, in which said measuring means measures the temperature of an air flowing out of said heating chamber, in order to relatively measure the temperature of the object being heated.

13. A high frequency energy apparatus according to claim 12, in which said measuring means includes a temperature-sensitive element, the temperature measured by said measuring means is indicated in the form of a voltage corresponding to it, and said reference value is also given as a voltage.

14. A high frequency energy apparatus according to claim 13, in which said reference value correcting means includes a capacitor and means for charging and discharging said capacitor, said reference voltage being a voltage corresponding to the voltage across said capacitor.

15. A high frequency energy apparatus according to claim 14, in which, in use, said capacitor is preliminarily charged up to a predetermined level by said charge/discharge means and subsequently discharged with a time constant of said charge/discharge means.

16. A high frequency energy apparatus according to claim 15, in which said high frequency energy supply emount control means includes comparator means for comparing said voltage corresponding to said measured temperature with said reference voltage so that the amount of the high frequency energy supplied to said heating chamber from said high frequency energy generating means is controlled when the output of said comparator means reaches a predetermined level.

17. A high frequency energy apparatus according to claim 16, in which said comparator means is a differential amplifier having two input terminals, said voltage corresponding to said measured temperature being applied to one of said two input terminals of said differential amplifier, said reference voltage being applied to the other input terminal of said differential amplifier, said differential amplifier having an output circuit including an electromagnetic relay for controlling the operation of said high frequency energy generating means.

18. A high frequency energy apparatus according to claim 14, in which, in use, said capacitor is preliminarily dischared to a predetermined level by said charge/discharge means and subsequently charged with a time constant of said charge/discharge means.

19. A high frequency energy apparatus according to claim 18, in which said high frequency energy supply amount control means includes comparator means for comparing said voltage corresponding to said measured temperature with said reference voltage so that the amount of the high frequency energy supplied to said heating chamber from said high frequency energy generating means is controlled when the output of said comparator means reaches a predetermined level.

20. A high frequency energy apparatus according to claim 19, in which said comparator means is a differential amplifier having two input terminals, said voltage corresponding to said measured temperature being applied to one of said two input terminals of said differential amplifier, said reference voltage being applied to the other input terminal of said differential amplifier, said differential amplifier having an output circuit including an electromagnetic relay for controlling the operation of said high frequency energy generating means.

21. A high frequency energy apparatus according to claim 14, in which a DC voltage is coupled to a low potential side of said capacitor to prevent said reference voltage from decreasing below a predetermined value during the heating period.

22. A high frequency energy apparatus according to claim 1, in which said temperature measuring means measures the difference between the temperature of the atmosphere surrounding said high frequency energy apparatus and the temperature of an air inside of said heating chamber in order to relatively detect the temperature of said object being heated.

23. A high frequency energy apparatus according to claim 1, in which said temperature measuring means measures the difference between the temperature of the atmosphere surrounding said high frequency energy apparatus and the temperature of an air flowing out of said heating chamber in order to relatively detect the temperature of said object being heated.

* * * * *